United States Patent
Zeng et al.

(10) Patent No.: US 9,100,261 B2
(45) Date of Patent: Aug. 4, 2015

(54) FREQUENCY-DOMAIN AMPLITUDE NORMALIZATION FOR SYMBOL CORRELATION IN MULTI-CARRIER SYSTEMS

(71) Applicants: Jianqiang Zeng, Austin, TX (US);
Steven M. Bosze, Cedar Park, TX (US);
Raja V. Tamma, Leander, TX (US);
Kevin B. Traylor, Austin, TX (US)

(72) Inventors: Jianqiang Zeng, Austin, TX (US);
Steven M. Bosze, Cedar Park, TX (US);
Raja V. Tamma, Leander, TX (US);
Kevin B. Traylor, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 13/924,792

(22) Filed: Jun. 24, 2013

(65) Prior Publication Data
US 2014/0376648 A1 Dec. 25, 2014

(51) Int. Cl.
*H04K 1/10* (2006.01)
*H04L 27/28* (2006.01)
*H04L 27/26* (2006.01)

(52) U.S. Cl.
CPC .................. *H04L 27/2655* (2013.01)

(58) Field of Classification Search
CPC ... H04L 5/0007; H04L 5/0053; H04L 5/0048; H04L 27/2613; H04L 27/2647
See application file for complete search history.

(56) References Cited

U.S. PATENT DOCUMENTS

| | | | |
|---|---|---|---|
| 5,263,048 A | 11/1993 | Wade | |
| 6,002,807 A * | 12/1999 | Guerci | 382/278 |
| 6,230,122 B1 | 5/2001 | Wu et al. | |
| 6,359,933 B1 | 3/2002 | Aslanis et al. | |
| 6,411,662 B1 * | 6/2002 | Sakoda et al. | 375/340 |

(Continued)

FOREIGN PATENT DOCUMENTS

| | | |
|---|---|---|
| EP | 1479186 B1 | 7/2007 |
| EP | 2445157 A1 | 4/2012 |
| WO | WO 0004657 | 1/2000 |

OTHER PUBLICATIONS

Nandula et al., "Robust Timing Synchronization for OFDM Based Wireless Lan System", IEEE, 4 pgs (2003).

(Continued)

*Primary Examiner* — Shuwang Liu
*Assistant Examiner* — Gina McKie
(74) *Attorney, Agent, or Firm* — Egan, Peterman, & Enders LLP.

(57) ABSTRACT

Methods and systems are disclosed for frequency-domain amplitude normalization for symbol correlation in multi-carrier communication systems. Digital samples associated with input signals received from a communication medium are processed using a Fast Fourier Transform (FFT) to generate complex frequency components. Each complex frequency component is normalized with respect to its amplitude, and the frequency-domain, amplitude-normalized frequency components are multiplied with frequency components for reference symbol(s) to generate frequency-domain correlation values. These frequency-domain correlation values are analyzed to determine if a correlation exists between the amplitude-normalized frequency components and the predetermined reference frequency components. A correlation detection output is then generated that indicates whether or not a symbol synchronization was achieved. The disclosed embodiments are particularly useful for symbol correlation in received signals for power line communication (PLC) systems.

20 Claims, 4 Drawing Sheets

(56) References Cited

U.S. PATENT DOCUMENTS

| | | | |
|---|---|---|---|
| 6,748,036 | B1 | 6/2004 | Tsurumaru |
| 6,785,429 | B1* | 8/2004 | Senoh ..................... 382/305 |
| 6,912,262 | B1 | 6/2005 | Chini et al. |
| 6,993,084 | B1* | 1/2006 | Eberlein et al. ............ 375/260 |
| 7,856,063 | B2 | 12/2010 | Coulson |
| 7,986,922 | B2 | 7/2011 | Glazko et al. |
| 8,068,570 | B2 | 11/2011 | Catreux et al. |
| 8,085,879 | B2 | 12/2011 | Birkett et al. |
| 8,139,614 | B2 | 3/2012 | Razazian et al. |
| 8,165,172 | B2 | 4/2012 | Razazian et al. |
| 2003/0123582 | A1 | 7/2003 | Kim et al. |
| 2005/0053259 | A1* | 3/2005 | Asano et al. .................. 382/100 |
| 2005/0152326 | A1 | 7/2005 | Vijayan et al. |
| 2006/0061329 | A1 | 3/2006 | Dawson |
| 2006/0116095 | A1 | 6/2006 | Henriksson |
| 2007/0058693 | A1 | 3/2007 | Aytur et al. |
| 2007/0121491 | A1 | 5/2007 | Kaiki |
| 2009/0041169 | A1 | 2/2009 | Fujita et al. |
| 2009/0190510 | A1 | 7/2009 | Kobayashi |
| 2010/0135335 | A1 | 6/2010 | Matsumoto et al. |
| 2011/0069774 | A1 | 3/2011 | Wang et al. |
| 2011/0200058 | A1 | 8/2011 | Mushkin et al. |
| 2012/0155487 | A1 | 6/2012 | Du et al. |
| 2012/0170684 | A1 | 7/2012 | Yim et al. |
| 2014/0376540 | A1 | 12/2014 | Zeng et al. |

OTHER PUBLICATIONS

Zhidkov, "Performance Analysis and Optimization of OFDM Receiver With Blanking Nonlinearity in Impulsive Noise Environment", IEEE Transactions on Vehicular Technology, vol. 55, No. 1, 9 pgs (Jan. 2006).

Zhidkov, "Impulsive Noise Suppression in OFDM Based Communication Systems", IEEE Transactions on Consumer Electronics, vol. 49, No. 4, 5 pgs (Nov. 2003).

Zhidkov, "Analysis and Comparison of Several Simple Impulsive Noise Mitigation Schemes for OFDM Receivers", IEEE Transactions on Communications, vol. 56, No. 1, 5 pgs (Jan. 2008).

DiPietro, "An FFT Based Technique for Suppressing Narrow-Band Interference in PN Spread Spectrum Communications Systems," IEEE, 4 pgs (1989).

ERDF, "PLC G3 Physical Layer Specification", 46 pgs (Obtained from Internet May 2, 2013).

Zeng et al., "Frequency-Domain Carrier Blanking for Multi-Carrier Systems", U.S. Appl. No. 13/924,940, filed Jun. 24, 2013, 22 pgs.

Zeng et al., "Frequency-Domain Frame Synchronization in Multi-Carrier Systems", U.S. Appl. No. 13/924,996, filed Jun. 24, 2013, 25 pgs.

Zeng et al., "Frequency-Domain Symbol and Frame Synchronization in Multi-Carrier Systems", U.S. Appl. No. 13/925,023, filed Jun. 24, 2013, 28 pgs.

Office Action dated Oct. 8, 2014, for Zeng et al., "Frequency-Domain Carrier Blanking for Multi-Carrier Systems", U.S. Appl. No. 13/924,940, filed Jun. 24, 2013, 17 pgs.

Office Action dated Nov. 24, 2014, for Zeng et al., "Frequency-Domain Frame Synchronization in Multi-Carrier Systems", U.S. Appl. No. 13/924,996, filed Jun. 24, 2013, 17 pgs.

Office Action dated Nov. 10, 2014, for Zeng et al., "Frequency-Domain Symbol and Frame Synchronization in Multi-Carrier Systems", U.S. Appl. No. 13/925,023, filed Jun. 24, 2013, 15 pgs.

Response to Office Action dated Jan. 8, 2015, for Zeng et al., "Frequency-Domain Carrier Blanking for Multi-Carrier Systems", U.S. Appl. No. 13/924,940, filed Jun. 24, 2013, 10 pgs.

Response to Office Action dated Feb. 10, 2015, for Zeng et al., "Frequency-Domain Symbol and Frame Synchronization in Multi-Carrier Systems", U.S. Appl. No. 13/925,023, filed Jun. 24, 2013, 8 pgs.

Response filed Feb. 24, 2015, for Zeng et al., "Frequency-Domain Frame Synchronization in Multi-Carrier Systems", U.S. Appl. No. 13/924,996, filed Jun. 24, 2013, 8 pgs.

Final Office Action mailed Apr. 24, 2015, for Zeng et al., "Frequency-Domain Carrier Blanking for Multi Carrier Systems", U.S. Appl. No. 13/924,940, filed Jun. 24, 2013, 20 pgs.

Zeng et al., "Frequency-Domain Frame Synchronization in Multi-Carrier Systems", Filed Jun. 24, 2013, U.S. Appl. No. 13/924,996, Notice of Allowance mailed Jun. 8, 2015, 9 pgs.

Office Action mailed Jun. 15, 2015, in Zeng et al., "Frequency-Domain Symbol And Frame Synchronization In Multi-Carrier Systems", Filed Jun. 24, 2013, U.S. Appl. No. 13/925,023, 14 pgs.

* cited by examiner

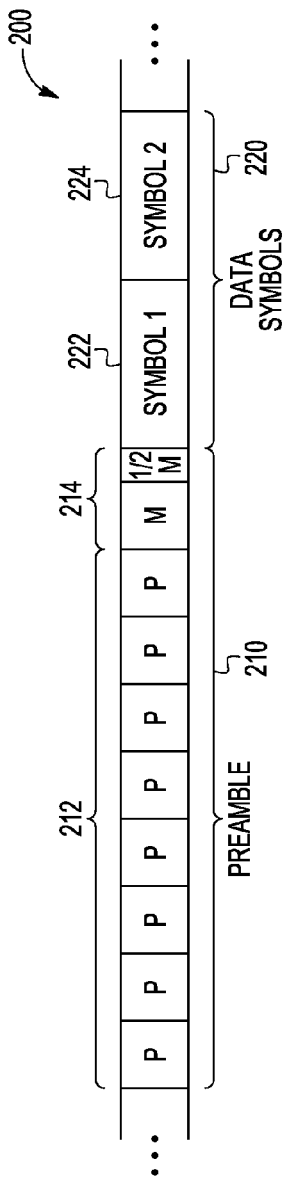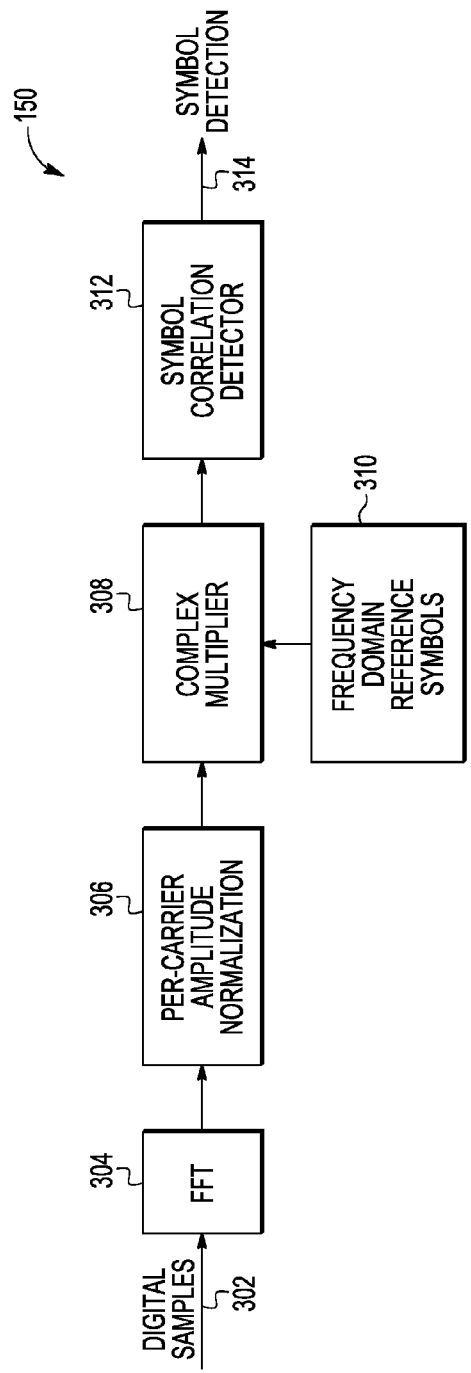

FREQUENCY-DOMAIN AMPLITUDE NORMALIZATION FOR SYMBOL CORRELATION IN MULTI-CARRIER SYSTEMS

RELATED APPLICATIONS

This application is related in subject matter to the following concurrently filed applications: U.S. patent application Ser. No. 13/924,996, entitled "FREQUENCY-DOMAIN FRAME SYNCHRONIZATION IN MULTI-CARRIER SYSTEMS;" and U.S. patent application Ser. No. 13/925,023, entitled "FREQUENCY-DOMAIN SYMBOL AND FRAME SYNCHRONIZATION IN MULTI-CARRIER SYSTEMS;" each of which is hereby incorporated by reference in its entirety.

TECHNICAL FIELD

This technical field relates to synchronization of received signals in multi-carrier environments.

BACKGROUND

In multi-carrier systems, data is transmitted on multiple subcarriers and then collected at a receiver for the multi-carrier system. OFDM (orthogonal frequency division multiplexing) signals are used by some multi-carrier systems where transmitted data is modulated on a number of closely spaced orthogonal subcarriers. Further, some multi-carrier systems utilize standard transmission protocols to facilitate the detection and synchronization of received signals. For example, a preamble waveform can be used to precede or follow data transmissions to allow a receiver to synchronize to the transmitted signal and to have a reference point to start demodulation of the transmitted signals. Power line communication (PLC) systems, for example, have utilized reference preambles and OFDM signals for multi-carrier communications across power lines between transmitters and receivers.

Synchronization is typically required for the receiver to know the precise instant in time that the data arrives on the transmission medium. Typically, time domain correlation of a detected signal with respect to a known reference signal is utilized to synchronize a receiver to the transmitted signal. However, in the presence of interfering signals synchronization performance can be significantly degraded. In particular, impulsive noise and narrow band interference can result in poor synchronization performance for PLC receivers. These types of noise exceed what is typically seen in other communication environments, such as USB (universal serial bus) and RF communications. As such, PLC channels are particularly harsh environments for receiver synchronization.

DESCRIPTION OF THE DRAWINGS

It is noted that the appended figures illustrate only example embodiments and are, therefore, not to be considered as limiting the scope of the present invention. Elements in the figures are illustrated for simplicity and clarity and have not necessarily been drawn to scale.

FIG. 2 is a signal diagram of an example embodiment for a multi-carrier signal including a preamble including reference symbols as utilized in some PLC systems.

FIG. 3 is a block diagram of an example embodiment of a frequency-domain symbol detection block for processing multi-carrier input signals.

DETAILED DESCRIPTION

Figure 1:
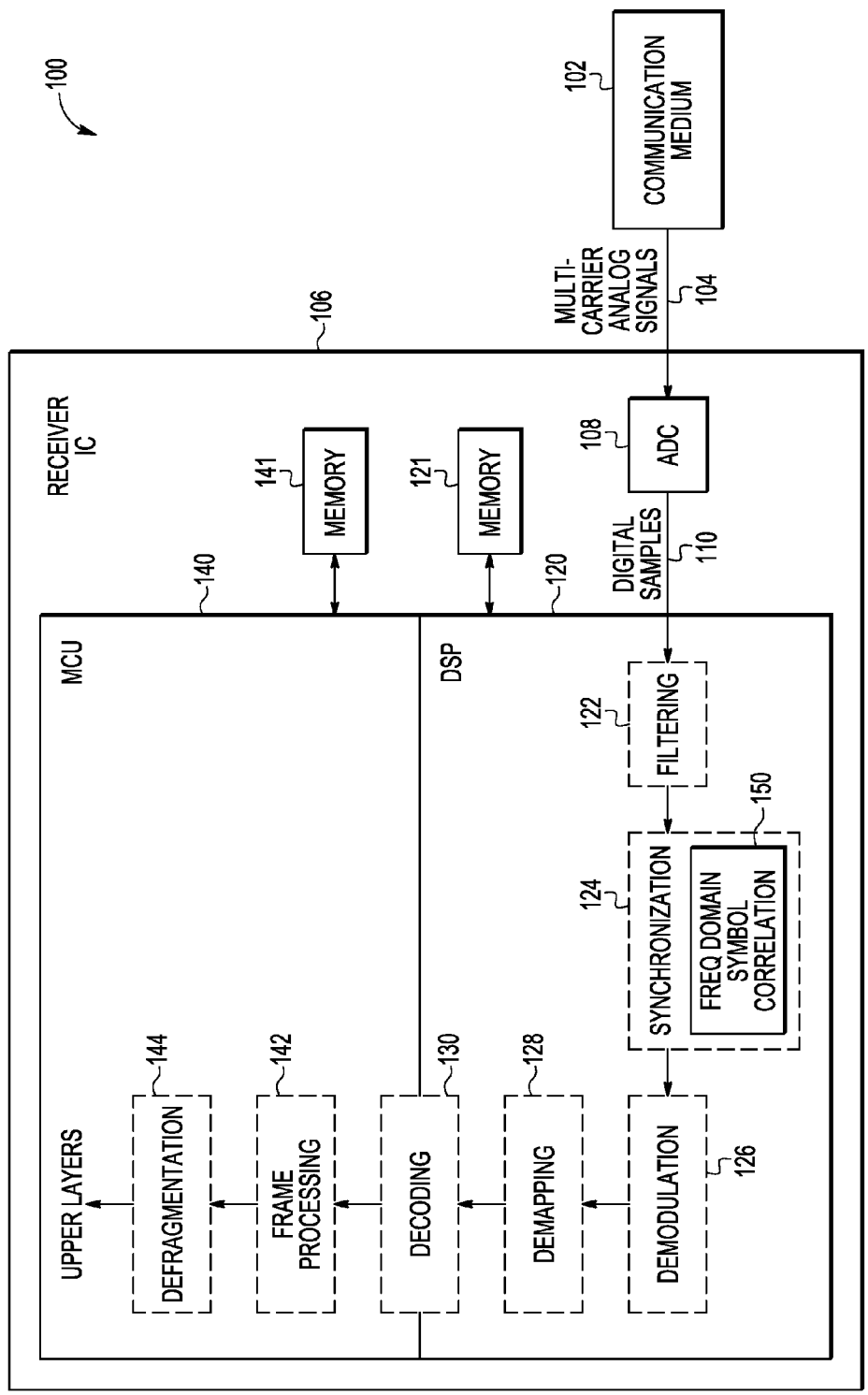
FIG. 1 is a block diagram of an example embodiment of a receiver system including frequency-domain symbol correlation.

Methods and systems are disclosed for frequency-domain amplitude normalization for symbol correlation in multi-carrier communication systems. Digital samples associated with input signals received from a communication medium are processed using a Fast Fourier Transform (FFT) to generate complex frequency components. Each complex frequency component is normalized with respect to its amplitude, and the frequency-domain, amplitude-normalized frequency components are multiplied with frequency components for reference symbol(s) to generate frequency-domain correlation values. These frequency-domain correlation values are analyzed to determine if a correlation exists between the amplitude-normalized frequency components and the predetermined reference frequency components. A correlation detection output is then generated that indicates whether or not a symbol synchronization was achieved. The disclosed embodiments are particularly useful for symbol correlation in received signals for power line communication (PLC) systems. Different features and variations can be implemented, as desired, and related or modified systems and methods can be utilized, as well.

As described herein, the disclosed embodiments utilize frequency-domain amplitude normalization of received multi-carrier signals to improve symbol synchronization performance by effectively reducing the impact of impulsive noise and narrow band interference on frequency-domain correlation. Without this amplitude normalization, impulsive noise and narrow band interference, particularly in power line communication (PLC) systems, negatively affects frequency-domain correlation peaks resulting in poor synchronization performance. The frequency-domain amplitude normalization is achieved by performing an FFT on digital samples of the received signals and then by normalizing the in-band subcarrier components of the FFT output. The amplitude-normalized FFT output values are then correlated with frequency-domain reference symbols to produce correlated output values. These correlated output values are then analyzed to detect symbol synchronization. For example, a peak-search can be applied to the correlation values, and peak values exceeding a threshold value can be used to indicate symbol boundary for symbol synchronization. In contrast with prior time domain correlation approaches, the described embodiments perform amplitude normalization in the frequency domain on the FFT outputs prior to frequency-domain correlation with the frequency-domain reference symbols.

By applying per-carrier amplitude normalization in the frequency domain, the disclosed embodiments improve correlation values for symbol synchronization. As described below, after time domain digital samples are resolved into their frequency components using an FFT, the in-band components of the FFT output are normalized by their own magnitude. The normalized frequency component values are then correlated with the same frequency components of the reference symbols. Symbol detection and synchronization is achieved if and when a correlation value exceeds a pre-defined threshold. Advantageously, the frequency-domain amplitude normalization prior to correlation processing improves accuracy of symbol detection and thereby synchronization performance by effectively reducing the amplitude of narrow band tone interference introduced by the communication channel. It is noted that in-band frequency components refer to frequency components that are within the transmission band for the signals being received through a communication medium. It is further noted that although G3-PLC standard is used for an example illustration of the disclosed embodiments, the disclosed embodiments can be utilized with other modern PLC standards and other non-PLC communication standards.

As further described herein, the per-carrier amplitude normalization for symbol synchronization is performed after using an FFT to generate frequency components related to digital samples for the received signals. Other techniques could also be utilized, if desired, to generate the frequency components. The symbol synchronization processes a subset of stored digital samples (e.g., X samples if there are X samples per symbol) to compute a correlation value with respect to frequency components for symbol reference symbol(s) (e.g., SYNCP symbol). Digital samples can then be shifted, and new correlation values can be recomputed. The symbol synchronization correlation values can then be analyzed to determine a symbol boundary (e.g., edge timing for received symbols) for the received signals. The detected symbol boundary can be used for subsequent frame synchronization. It is noted that a reference preamble can be used for multi-carrier transmissions that include symbols configured to facilitate the detection of symbol boundaries (e.g., SYNCP symbols) within the receiver. It is assumed that there are X samples associated with each symbol where X depends upon the sample rate and the symbol time period (i.e., the transmit time period for each symbol) for the communication protocol being utilized. For example, with the G3-PLC standard, a sampling rate of 400 ksps (kilo samples per second) can be used for a symbol time period of 715 microseconds to generate 256 samples per symbol after removal of the 30 sample cyclic prefix.

It is noted that the functional blocks described herein can be implemented using hardware, software, or a combination of hardware and software, as desired. In addition, one or more processors running software and/or firmware can also be used, as desired, to implement the disclosed embodiments. It is further understood that one or more of the operations, tasks, functions, or methodologies described herein may be implemented, for example, as software or firmware and/or other program instructions that are embodied in one or more non-transitory tangible computer readable mediums (e.g., memory) and that are executed by one or more controllers, microcontrollers, microprocessors, hardware accelerators, and/or other processors to perform the operations and functions described herein.

FIG. 1 is a block diagram of an example embodiment 100 of a receiver system including the frequency-domain symbol correlation block 150. For the embodiment 100 depicted, a receiver integrated circuit (IC) 106 is configured to receive multi-carrier analog signals 104 from a communication medium 102. The receiver IC 106 includes analog-to-digital converter (ADC) circuitry 108, digital signal processor (DSP) 120, and a microcontroller unit (MCU) 140. One or more memories can also be included within receiver IC 106 and be coupled to DSP 120 and MCU 140, such as for example memory 141 and a memory 121. The DSP 120 includes filtering block 122, synchronization block 124, demodulation block 126, demapping block 128, and decoding block 130. The decoding block 130 also transitions into the MCU 140, which also includes frame processing block 142, and defragmentation block 144. The synchronization block 124 includes frequency-domain symbol correlation block 150, which is described further below. It is noted that the receiver system depicted can also be implemented as a transceiver, if desired, such that the system also includes a transmitter and related operational blocks that allow the system to transmit multi-carrier signals through the communication medium 102. Other variations could also be implemented.

In operation, the received multi-carrier analog signals 104 are digitized by the ADC circuitry 108 to produce digital samples 110 associated with symbols within the received analog signals 104. The ADC circuitry 108 can be configured to generate only real (I) or both real (I) and imaginary (Q) components for each digital sample. The digital samples 110 are filtered by filtering block 122 and provided to synchronization block 124. The frequency-domain symbol correlation block 150 with the synchronization block 124 correlates the received digital samples with the preamble reference symbols in the frequency domain as described in more detail herein. The output from synchronization block 124 are demodulated by demodulation block 128 and demapped by demapping block 128, according to the modulation and mapping techniques used in the received signals. Decoding block 130 decodes the resulting information and provides the decoded data to frame processing block 142. After the frames are processed, they are defragmented by defragmentation block 144. The resulting data can then be used and/or processed further by upper layer blocks, such as application layer blocks. Further, the receiver IC 106 can provide outputs to external processing blocks or devices for further processing, if desired.

It is noted that the communication medium 102 can be a wired medium, such as for example, a power line through which signals are communicated. The communication medium could also be a wireless medium, if desired. It also is noted that the multi-carrier analog signals 104 can be, for example, OFDM (orthogonal frequency division multiplexing) signals transmitted through power line channels according to standards for PLC (power line communication) transmissions, such as the G3-PLC standard for PLC systems (G3-PLC). Other multi-carrier signals could also be utilized if desired. Further, it is noted that the receiver IC 106 can include additional and/or different functional blocks or could be implemented using other receiver configurations, as desired. For example, the receiver IC 106 could include a mixer configured to mix the incoming multi-carrier analog signals 104 to a lower frequency range prior to digitization by the ADC circuitry 108. It is also noted that the ADC circuitry 108 can be configured, if desired, to generate real (I) and imaginary (Q) components for each digital sample. Further, as indicated above, the IC 106 could be implemented as a transceiver and thereby include a transmitter and related operational blocks in addition to receiver related operational blocks. Other variations could also be implemented, if desired.

FIG. 2 is a signal diagram of an example embodiment 200 for a multi-carrier signal as utilized in PLC systems according to the G3-PLC standard. The transmitted signals include reference symbols within preamble 210 that are placed at the beginning of a transmission and data symbols 220 that provide the data payload for the transmission. The data symbols 220 include one or more symbols representing payload data, such as a first symbol (SYMBOL1) 222 and second symbol (SYMBOL2) 224. The preamble 210 includes eight (8) SYNCP reference symbols (P) 212 and one-and-a-half (1½) SYNCM reference symbols (M) for a total preamble length of 9½ symbols. The SYNCP symbols are identical and include a reference data sequence that can be used for symbol synchronization in G3-PLC receivers. The SYNCM symbol is the inverse of the SYNCP symbol and can be used for determination of the frame boundary in G3-PLC receivers. It is noted that header symbols within the preamble 210 can be part of the transmission that includes the data symbols 220 or can be transmitted separately. In addition, the preamble 210 can be present before or after the data symbols 220. It is further noted that a variety of reference symbols could be utilized and that reference symbols are typically designed to have good auto-correlation and cross-correlation properties. It is further noted that with respect to the preamble 210, different numbers of SYNCP symbols 212 and different numbers of SYNCM symbols could be utilized, including fractional numbers.

As described above, for symbol synchronization, prior solutions typically applied a time domain correlation of received signals to reference signals to determine symbol boundaries. In contrast to prior solutions, the embodiments described apply frequency-domain correlations for symbol synchronization. In particular, the embodiments described herein help to mitigate the effects of noise on a per-carrier basis in multi-carrier systems by applying per-carrier amplitude normalization and correlation within the frequency domain. Advantageously, when frequency-domain correlation is used in conjunction with amplitude normalization, correlation performance and synchronization performance is significantly enhanced by countering the impact of tone interference, narrow-band noise and impulses. Without mitigation of these disturbances, perturbed carriers within the received multi-carrier signals can adversely affect the correlation results for symbol synchronization, leading to poor symbol synchronization performance.

FIG. 3 is a block diagram of an example embodiment of the frequency-domain symbol correlation block 150 utilized for processing multi-carrier input signals. The input signals 302 can be digital samples associated with the received multi-carrier signals. If desired, these digital samples 302 can be filtered digital samples, for example, digital samples filtered by filtering block 122, as described above with respect to FIG. 1, although unfiltered digital samples could also be utilized. The digital samples 302 for a symbol time (e.g., X digital samples per symbol) are provided to FFT block 304 that operates to resolve the digital samples 302 into complex frequency-domain components corresponding to the subcarriers within the multi-carrier input signals. The frequency-domain components are provided to per-carrier amplitude normalization block 306 that normalizes each frequency component by its amplitude. The normalized frequency-domain components are then provided to complex multiplier 308 which multiplies the normalized frequency components of the received signal with the corresponding frequency components of the reference symbols. Non-complex multiplications could also be utilized. The resulting output values are then provided to symbol correlation detector 312 that operates to determine if a correlation exists between the normalized frequency components from block 306 and the frequency-domain reference symbols 310. For example, the output values can be combined to generate a correlation value, and the digital samples can be shifted by one sample and correlation values can be recomputed to generate multiple correlation values. If one or more correlation values exceed a predefined threshold value, the symbol correlation detector block 312 determines that a symbol synchronization is achieved. If no correlation values exceed a predefined threshold value, the symbol correlation detector block 132 determines that no symbol synchronization is achieved. The symbol correlation detector 312 provides a symbol detection output 314 that indicates whether or not symbol synchronization was achieved and that provides additional information, such as the location of the symbol boundary. The symbol detection output 314 can be in part, for example, a binary value having one state if correlation was detected and an opposite state if correlation was not detected. The symbol detection output 314 can provide additional information, as well. Further, the symbol detection output 314 can be utilized by other functional blocks, such as the additional blocks shown in FIG. 1, where further processing can be performed.

It is noted that the symbol synchronization techniques described herein can be utilized in combination with symbol synchronization techniques described in concurrently filed U.S. patent application Ser. No. 13/925,023, entitled "FREQUENCY-DOMAIN SYMBOL AND FRAME SYNCHRONIZATION IN MULTI-CARRIER SYSTEMS," which is hereby incorporated by reference in its entirety. It is further noted that the symbol synchronization and per-carrier amplitude normalization techniques described herein can be utilized in combination with the frame synchronization techniques described in concurrently filed U.S. patent application Ser. No. 13/924,996, entitled "FREQUENCY-DOMAIN FRAME SYNCHRONIZATION IN MULTI-CARRIER SYSTEMS" and concurrently filed U.S. patent application Ser. No. 13/925,023, entitled "FREQUENCY-DOMAIN SYMBOL AND FRAME SYNCHRONIZATION IN MULTI-CARRIER SYSTEMS," each of which is hereby incorporated by reference in its entirety.

It is further noted that the frequency-domain reference symbols may be, for example, P symbols (SYNCP) 212 described with respect to FIG. 2 for G3-PLC communication systems. Further, it is noted that the per-carrier amplitude normalization provided by block 306 can be performed using the following equation:

$$Y_i = \frac{X_i}{|X_i|} \quad \text{where } i = 1 \text{ to } N \qquad \text{[EQUATION 1]}$$

For this EQUATION 1, the expression $Y_i$ represents a per-carrier amplitude normalized frequency component; the expression $X_i$ represents the per-carrier frequency component; and N represents the number of subcarriers for the multi-carrier signals. As represented by EQUATION 1, the per-carrier frequency component ($X_i$) is divided by its absolute magnitude value to generate the per-carrier amplitude normalized frequency component ($Y_i$). Both $Y_i$ and $X_i$ can be complex values, including real (I) and imaginary (Q) components, such that phase information is maintained after normalization.

In addition, it is noted that the normalization operation is performed separately for each of the N frequency components generated by the FFT block 304, such that a different Y, is generated for each subcarrier frequency component. It is also noted that other amplitude normalization equations and/or techniques could also be applied, if desired, while still providing per-carrier amplitude normalization. It is further noted that applying the frequency-domain normalization to the complex values ($X_i$) before performing correlation with frequency components for reference symbol(s) helps to ensure that the correlation values are immune to large amplitude interferers within the communication channel. Still further, as described above, this type of tone interference is common in PLC communication channels.

Figure 4:
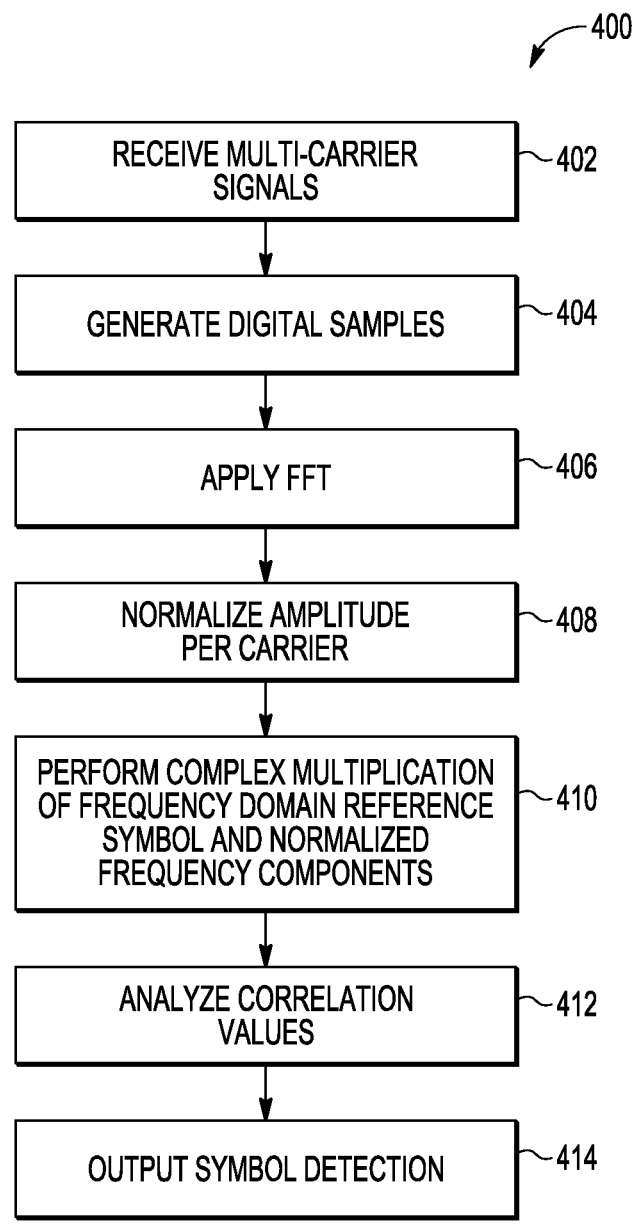
FIG. 4 is a process flow diagram of an example embodiment for processing multi-carrier input signals using frequency-domain symbol detection.

FIG. 4 is a process flow diagram of an example embodiment 400 for processing multi-carrier input signals using frequency-domain symbol correlation. In block 402, the input multi-carrier signals are received from the communication medium. In block 404, digital samples are generated. In block 406, an FFT is applied to the digital samples (e.g., X samples where there are X samples per symbol) to transform the digital samples into frequency components associated with the subcarriers within the received signals. Next, in block 408, the frequency components are normalized to form per-carrier normalized frequency components. A complex multiplication is then performed in block 410 with the normalized frequency components and a frequency-domain reference symbol to generate output values, which can be combined to generate a correlation value. Digital samples can further be shifted and correlation values recomputed so that a number of correlation values are generated for different sample offsets. A sample offset represents the relative location, and thereby relative time, of each sample. As described above, the reference symbol can include frequency components associated with a reference symbol used to identify transmissions, such as the SYNCP symbol in G3-PLC communications. Next, in block 412, the resulting correlation value(s) from block 410 are analyzed to determine if a synchronization correlation exists between the amplitude-normalized frequency components and the frequency components of the reference symbol. For example, the correlation value(s) can be compared to a predefined threshold. If and when one or more correlation values exceeds the predefined threshold, it is determined that symbol synchronization is achieved. Finally, in block 414, a symbol detection output is generated that indicates whether or not a synchronization was achieved. Other variations of the detection decision processing are possible. For example, a correlation can be deemed to exist only if multiple defined peaks above a selected threshold value are present within the correlation values.

As described herein, therefore, each frequency component of digital samples for symbols within the received signal is normalized by its own amplitude before frequency-domain symbol synchronization correlation is performed. Advantageously, this per-carrier normalization and frequency-domain correlation significantly improves symbol correlation and synchronization performance.

Figure 5:
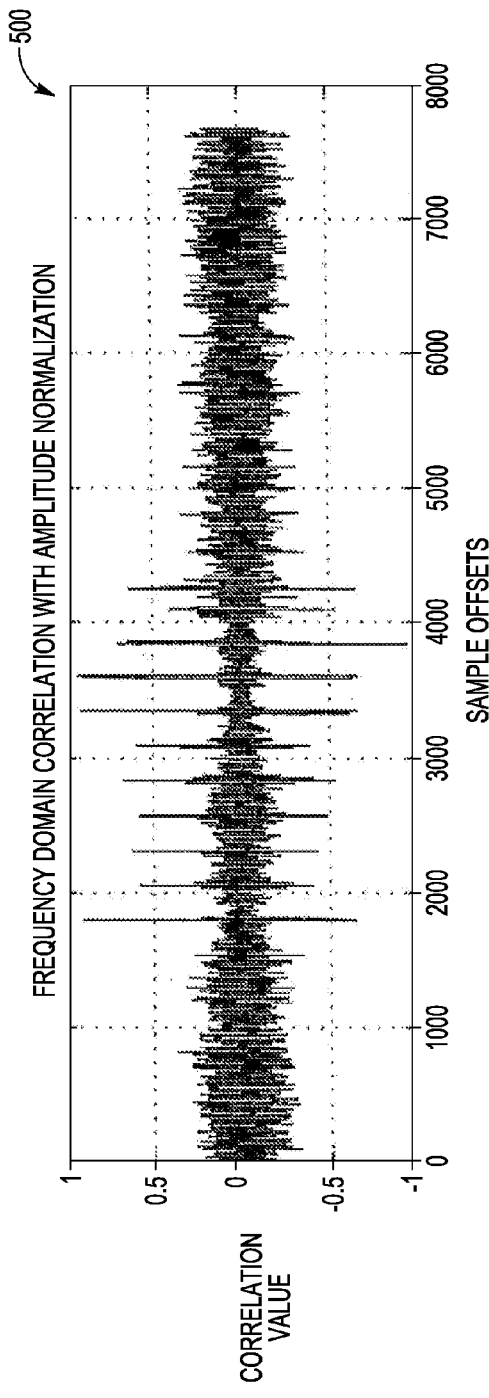
FIG. 5 is an example embodiment for a representative diagram for frequency-domain correlation values where per-carrier amplitude normalization is applied.

FIG. 5 is an example embodiment 500 for a representative diagram for frequency-domain correlation information where per-carrier amplitude normalization is applied. The y-axis represents a correlation value, and the x-axis represents sample offsets, in time, from about 0 to 7600. Each sample offset is a possible candidate for a symbol boundary. As seen in representative embodiment 500, significant peaks are present in the correlation values between about sample offset 1800 and sample offset 4200. As described herein, the presence of these peaks indicates a correlation exists between the frequency components of the received signals and the reference symbols. In particular, symbol synchronization can be deemed to have bee achieved if defined peaks are detected that exceed a predefined threshold value, and one or more of the sample offsets associated with these peaks can be used to indicate a symbol boundary. Advantageously, the strong peaks within correlation information allows for more accurate and reliable indications of correlation and associated symbol synchronization.

Figure 6:
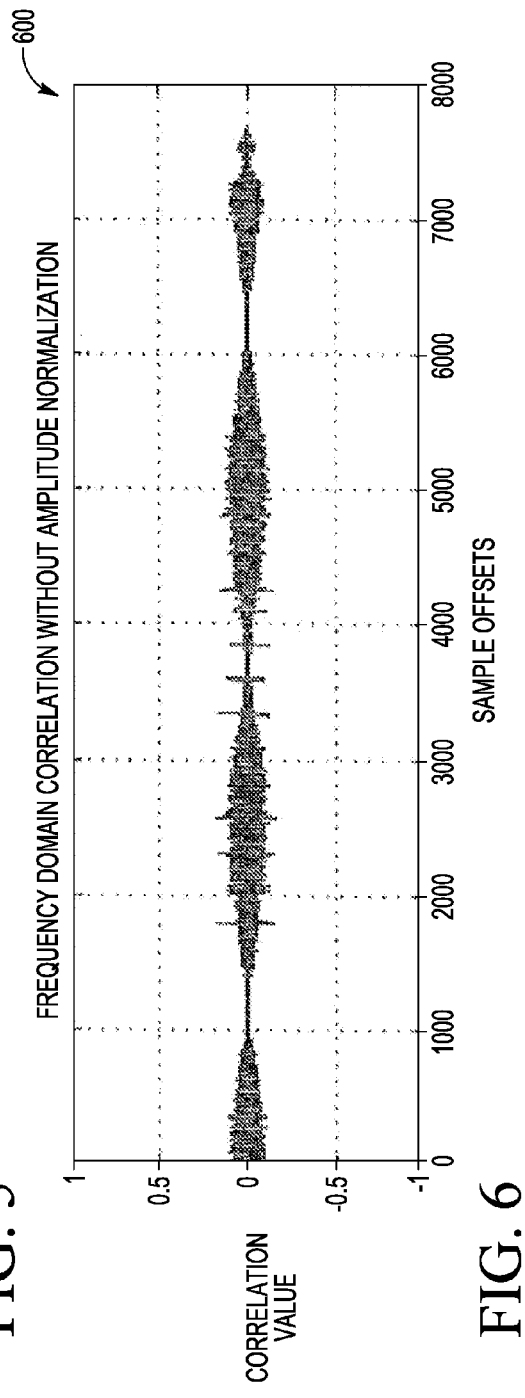
FIG. 6 is an example embodiment for a representative diagram for frequency-domain correlation values where per-carrier amplitude normalization is not applied.

FIG. 6 is an example embodiment 600 for a representative diagram for frequency-domain correlation information where per-carrier amplitude normalization is not applied. The y-axis again represents a correlation value, and the x-axis again represents sample offsets, in time, from about 0 to 7600. As seen in representative embodiment 600, peaks are difficult to identify in the correlation values. The lack of defined peaks for embodiment 600 makes it difficult to determine whether a correlation exists between the frequency components of the received signals and the reference symbols.

A comparison of embodiment 600 of FIG. 6 and embodiment 500 of FIG. 5 shows the advantages of applying the per-carrier amplitude normalization, as the peaks are much stronger and more well defined in embodiment 500 of FIG. 5. As such, while it is difficult to determine a predefined threshold level for peak detection for embodiment 500, such a predefined threshold level can be determined for peak detection for embodiment 600. For example, for the embodiment 500, a predefined threshold value of 0.5 could be utilized, and a peak having an absolute value that exceeds 0.5 could then be deemed to indicate a symbol boundary.

As described herein, a variety of embodiments can be implemented and different features and variations can be implemented, as desired.

One embodiment is a method for symbol synchronization for multi-carrier received signals including receiving input signals from a communication medium, digitizing the input signals to generate digital samples, generating frequency components for the digital samples, normalizing the amplitude for each frequency component to generate amplitude-normalized frequency components, determining frequency-domain correlation values based upon a correlation between the amplitude-normalized frequency components and predetermined frequency components for one or more reference symbols, and providing an indication of whether a symbol synchronization correlation exists between the amplitude-normalized frequency components and the frequency components of the reference symbols based upon the frequency-domain correlation values.

In further embodiments, the generating step can include applying a Fast Fourier Transform (FFT) to the digital samples to generate the frequency components. Further, the normalizing step can include dividing each frequency component by its magnitude to generate the amplitude-normalized frequency components. Still further, the determining step can include generating frequency-domain correlation values based upon a multiplication of the amplitude-normalized frequency components with the frequency components of the reference symbols. For other embodiments, the communication medium can be a power line communication medium, and the reference symbols can be OFDM symbols. In addition, the reference symbols can be one or more P symbols for power line communications (PLC) according to the G3-PLC standard. In still further embodiments, the method can further include searching the frequency-domain correlation values for one or more peaks above a threshold value to determine if a symbol synchronization correlation exists. Further, the method can include requiring a plurality of peaks to be detected above the threshold level prior to making a determination that a symbol synchronization correlation exists. Still further, the method can include utilizing a sample offset associated with a peak value above the threshold value to represent a symbol boundary for symbol synchronization. In addition, the method can include transmitting multi-carrier signals to the communication medium.

One other embodiment is a system for symbol synchronization for multi-carrier signals including analog-to-digital conversion circuitry configured to receive input signals from a communication medium and to output digital samples, a Fast Fourier Transform (FFT) block configured to generate frequency components for the digital samples, an amplitude normalization block configured to receive the frequency components and to generate amplitude-normalized frequency components, a correlation block configured to output frequency-domain correlation values based upon a correlation between the amplitude-normalized frequency components with predetermined frequency components for one or more reference symbols, and a correlation detector configured to provide an indication of whether a symbol synchronization correlation exists between the amplitude-normalized frequency components and the predetermined frequency components for the one or more reference symbols based upon the frequency-domain correlation values.

In further embodiments, the amplitude normalization block can be further configured to divide each frequency component by its magnitude to generate the amplitude-normalized frequency components. In further embodiments, the system can include a digital signal processor (DSP) including the FFT block, the amplitude normalization block, the correlation block, and the correlation detector block. Further, the correlation block can include a multiplier configured to output frequency-domain correlation values based upon a multiplication of the amplitude-normalized frequency components with the frequency components for one or more reference symbols. Still further the communication medium can be a power line communication medium, and the one or more reference symbols can be OFDM symbols. For other embodiments, the one or more reference symbols can be one or more P symbols for power line communications (PLC) according to the G3-PLC standard. In addition, the correlation detector can be further configured to search the frequency-domain correlation values for one or more peaks above a threshold value to determine if a synchronization correlation exists. In still further embodiments, the correlation detector can be configured to require detection of a plurality of peaks above the threshold level prior to determining that a synchronization correlation exists. Further, the correlation detector can be further configured to utilize a sample offset associated with a peak value above the threshold value to represent a symbol boundary for symbol synchronization. Still further, the system can include a filter coupled to receive the digital samples and to output filtered digital samples to the FFT block.

Unless stated otherwise, terms such as "first" and "second" are used to arbitrarily distinguish between the elements such terms describe. Thus, these terms are not necessarily intended to indicate temporal or other prioritization of such elements.

Further modifications and alternative embodiments of the described systems and methods will be apparent to those skilled in the art in view of this description. It will be recognized, therefore, that the described systems and methods are not limited by these example arrangements. It is to be understood that the forms of the systems and methods herein shown and described are to be taken as example embodiments. Various changes may be made in the implementations. Thus, although the invention is described herein with reference to specific embodiments, various modifications and changes can be made without departing from the scope of the present invention. Accordingly, the specification and figures are to be regarded in an illustrative rather than a restrictive sense, and such modifications are intended to be included within the scope of the present invention. Further, any benefits, advantages, or solutions to problems that are described herein with regard to specific embodiments are not intended to be construed as a critical, required, or essential feature or element of any or all the claims.

What is claimed is:

1. A method for symbol synchronization for multi-carrier received signals, comprising:
   receiving input signals from a communication medium;
   digitizing the input signals to generate digital samples;
   generating frequency components for the digital samples;
   normalizing the amplitude for each frequency component to generate amplitude-normalized frequency components;
   determining frequency-domain correlation values based upon a correlation between the amplitude-normalized frequency components and predetermined frequency components for one or more reference symbols; and
   providing an indication of whether a symbol synchronization correlation exists between the amplitude-normalized frequency components and the frequency components of the reference symbols based upon the frequency-domain correlation values.

2. The method of claim 1, wherein the generating step comprises applying a Fast Fourier Transform (FFT) to the digital samples to generate the frequency components.

3. The method of claim 1, wherein the normalizing step comprises dividing each frequency component by its magnitude to generate the amplitude-normalized frequency components.

4. The method of claim 1, wherein the determining step comprises generating frequency-domain correlation values based upon a multiplication of the amplitude-normalized frequency components with the frequency components of the reference symbols.

5. The method of claim 1, wherein the communication medium comprises a power line communication medium, and wherein the reference symbols comprise OFDM symbols.

6. The method of claim 5, wherein the reference symbols comprise one or more P symbols for power line communications (PLC) according to the G3-PLC standard.

7. The method of claim 1, further comprising searching the frequency-domain correlation values for one or more peaks above a threshold value to determine if a symbol synchronization correlation exists.

8. The method of claim 7, further comprising requiring a plurality of peaks to be detected above the threshold level prior to making a determination that a symbol synchronization correlation exists.

9. The method of claim 7, further comprising utilizing a sample offset associated with a peak value above the threshold value to represent a symbol boundary for symbol synchronization.

10. The method of claim 1, further comprising transmitting multi-carrier signals to the communication medium.

11. A system for symbol synchronization for multi-carrier signals, comprising:
    analog-to-digital conversion circuitry configured to receive input signals from a communication medium and to output digital samples;
    a Fast Fourier Transform (FFT) block configured to generate frequency components for the digital samples;
    an amplitude normalization block configured to receive the frequency components and to generate amplitude-normalized frequency components;
    a correlation block configured to output frequency-domain correlation values based upon a correlation between the amplitude-normalized frequency components with predetermined frequency components for one or more reference symbols; and a correlation detector configured to provide an indication of whether a symbol synchronization correlation exists between the amplitude-normalized frequency components and the predetermined frequency components for the one or more reference symbols based upon the frequency-domain correlation values.

12. The system of claim 11, wherein the amplitude normalization block is further configured to divide each frequency component by its magnitude to generate the amplitude-normalized frequency components.

13. The system of claim 11, further comprising a digital signal processor (DSP) including the FFT block, the amplitude normalization block, the correlation block, and the correlation detector block.

14. The system of claim 11, wherein the correlation block comprises a multiplier configured to output frequency-domain correlation values based upon a multiplication of the amplitude-normalized frequency components with the frequency components for one or more reference symbols.

15. The system of claim 11, wherein the communication medium comprises a power line communication medium, and wherein the one or more reference symbols comprise OFDM symbols.

16. The system of claim 15, wherein the one or more reference symbols comprise one or more P symbols for power line communications (PLC) according to the G3-PLC standard.

17. The system of claim 11, wherein the correlation detector is further configured to search the frequency-domain correlation values for one or more peaks above a threshold value to determine if a synchronization correlation exists.

18. The system of claim 17, wherein the correlation detector is configured to require detection of a plurality of peaks above the threshold level prior to determining that a synchronization correlation exists.

19. The system of claim 18, where the correlation detector is further configured to utilize a sample offset associated with a peak value above the threshold value to represent a symbol boundary for symbol synchronization.

20. The system of claim 11, further comprising a filter coupled to receive the digital samples and to output filtered digital samples to the FFT block.

* * * * *